(12) United States Patent
Waiters

(10) Patent No.: US 6,647,925 B1
(45) Date of Patent: Nov. 18, 2003

(54) ANIMAL CARRIER

(76) Inventor: Lawrence A. Waiters, 3550 N. Lawndale Ave., Chicago, IL (US) 60618

(*) Notice: Subject to any disclaimer, the term of this patent is extended or adjusted under 35 U.S.C. 154(b) by 0 days.

(21) Appl. No.: 10/209,570

(22) Filed: Jul. 30, 2002

(51) Int. Cl.$^7$ .................................. A01K 1/03
(52) U.S. Cl. ................ 119/494; 119/453; 119/482; 119/497
(58) Field of Search ................ 119/496, 497, 119/452, 453, 482, 498, 484, 499

(56) References Cited

U.S. PATENT DOCUMENTS

| | | | | |
|---|---|---|---|---|
| 3,490,417 A | * | 1/1970 | Swinney | 119/496 |
| 4,273,071 A | * | 6/1981 | Clark et al. | 119/453 |
| 4,697,548 A | * | 10/1987 | Malestein | 119/458 |
| D298,371 S | * | 11/1988 | Reynolds | D30/161 |
| D308,588 S | * | 6/1990 | Goetz | D30/109 |
| 5,140,948 A | * | 8/1992 | Roberts | 119/165 |
| 5,154,137 A | * | 10/1992 | Stanaland | 119/496 |
| 5,357,900 A | * | 10/1994 | Ho | 119/479 |
| D367,733 S | * | 3/1996 | Paxman et al. | D30/109 |
| 5,533,466 A | * | 7/1996 | Kohus et al. | 119/459 |
| D374,510 S | * | 10/1996 | Barreto et al. | D30/108 |
| 5,575,239 A | * | 11/1996 | Bradburn et al. | 119/500 |
| 5,701,843 A | * | 12/1997 | Lazides | 119/496 |
| 5,771,841 A | * | 6/1998 | Boor | 119/452 |
| 5,842,439 A | * | 12/1998 | Selstad | 119/481 |
| 6,182,611 B1 | * | 2/2001 | Marchioro | 119/453 |
| D445,222 S | * | 7/2001 | Ross | D30/108 |
| 6,327,997 B1 | * | 12/2001 | Terry et al. | 119/246 |
| 6,374,775 B1 | * | 4/2002 | Baumsteiger | 119/496 |
| 6,453,847 B2 | * | 9/2002 | Brooks | 119/484 |

\* cited by examiner

Primary Examiner—Yvonne Abbott
(74) Attorney, Agent, or Firm—Tyrone Davis; John S. Kendall; Davis & Kendall, PC

(57) ABSTRACT

The invention relates to an improved pet transport system. More specifically, to pet carriers allowing for extended travel periods on, planes, trains, and or car. The invention has a light source to help quiet the animals during transport.

4 Claims, 3 Drawing Sheets

ANIMAL CARRIER

BACKGROUND OF INVENTION

The invention relates to an improved pet transport system. More specifically, to pet carriers for animals allowing for extended travel periods on, planes, trains, and or car.

Pet carriers traditionally have come in all types of shapes and sizes. They come in various sizes to accommodate both large and small animals. As shown in U.S. Pat. No. D451,647 S issued Dec. 4, 2001 to Chrisco et al. The pet carrier can be isometrical with a handle.

As shown in U.S. Pat. No. D445,966 S issued Jul. 31, 2001 to Licciardello, the carrier can be a two piece construction having a mesh or screen upper area for ventilation.

What is needed but not provided in the prior art is pet carrier for extended travel on trains, planes, and automobiles. The advantages of having this configuration would be the ability to provide a light source to help calm the animal during periods of darkness, eliminating the unnecessary stress and prolonged howling by the animal.

SUMMARY OF THE INVENTION

The present invention relates to an improved pet transport system. More specifically, to pet carriers for animals allowing for extended travel periods on, planes, trains, and or car. The invention has a removable pad and a light source to help calm the animal during periods of darkness, eliminating the unnecessary stress and prolonged howling by the animal. The advantages of the present invention are the combination of the removable pad and a battery operated light source.

It is an object of the invention to provide a mobile housing for animals.

It is another object of the invention to provide a light source to calm the animal during transport.

Finally, another object of the invention is to provide a removable padding system that remains in place during transport.

Other features and advantages of the present invention will be apparent from the following description in which the preferred embodiments have been set forth in conjunction with the accompanying drawings

BRIEF DESCRIPTION OF THE DRAWINGS

In describing the preferred embodiments of the invention reference will be made to the series of figures and drawings briefly described below.

There may be additional structures described in the foregoing application that are not depicted on one of the described drawings. In the event such a structure is described but not depicted in a drawing, the absence of such a drawing should not be considered as an omission of such design from the specification.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
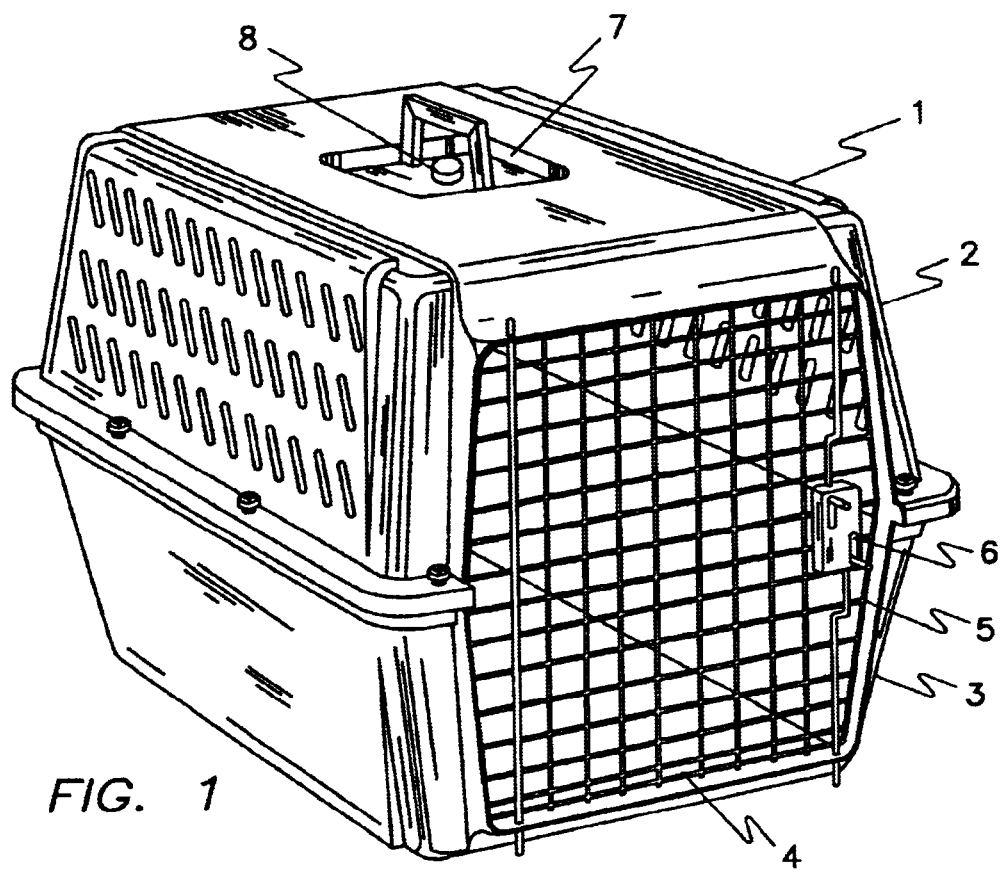
FIG. 1 shows an embodiment of the invention.
Figure 2:
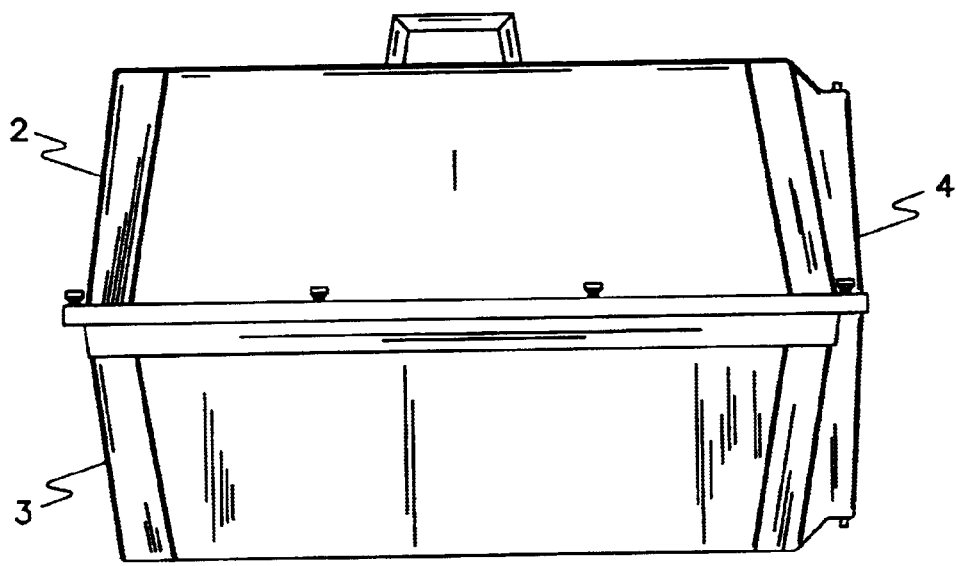
FIG. 2 shows a side view of the invention.
Figure 3:
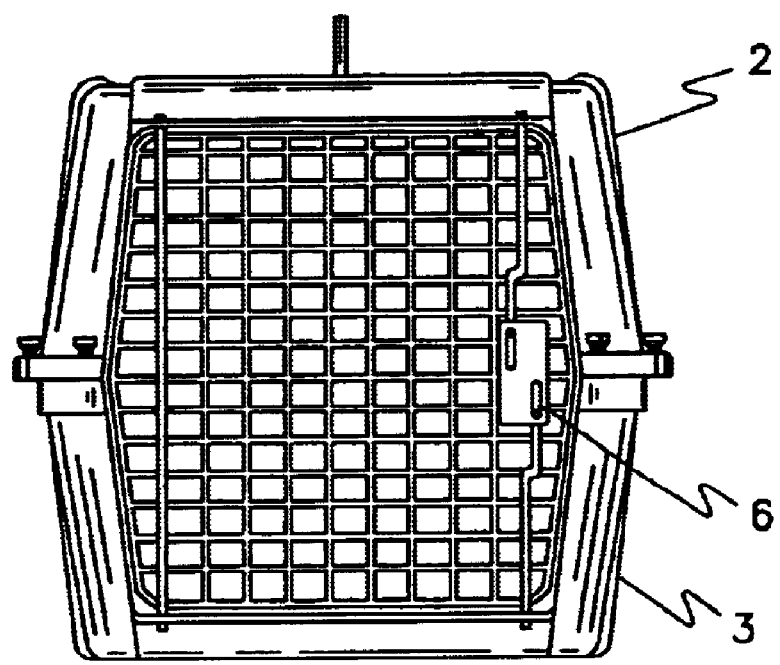
FIG. 3 shows the front of the invention.

Referring to FIGS. 1–3, the pet carrier (1) has an upper (2) and lower portion (3). A gate (4) has a latch (5) that incorporates a contact switch (6) which activates a light source. The upper portion (2) has a recessed area (7) that includes a shut off switch (8). The contact switch (6) turns the light source on during transport of the animal. Shut off switch (8) allows the handler to override the contact switch (6) and turn off the light source.

Figure 4:
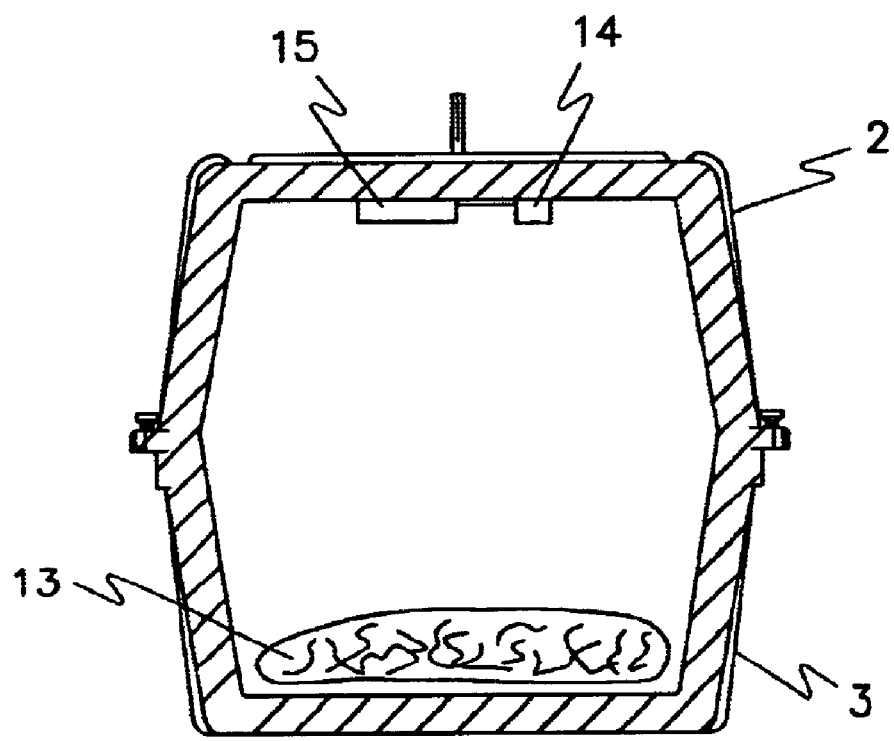
FIG. 4 shows a cut away of the invention.

The animal carrier (1) has ventilation vents (9) on one side (10) to facilitate fresh air and proper heat dissipation. The opposite side (11) may be ventless and designs, decorations and pictures can be affixed. A handle (12) allows the handler to easily carry the invention. As shown in FIG. 4, a removable pad (13) is located on the lower portion (3). A light source (14) is attached to the upper portion (2). Power is provided by a battery pack (15) that is wired to the light source (14) and shut off switch (8).

Figure 5:
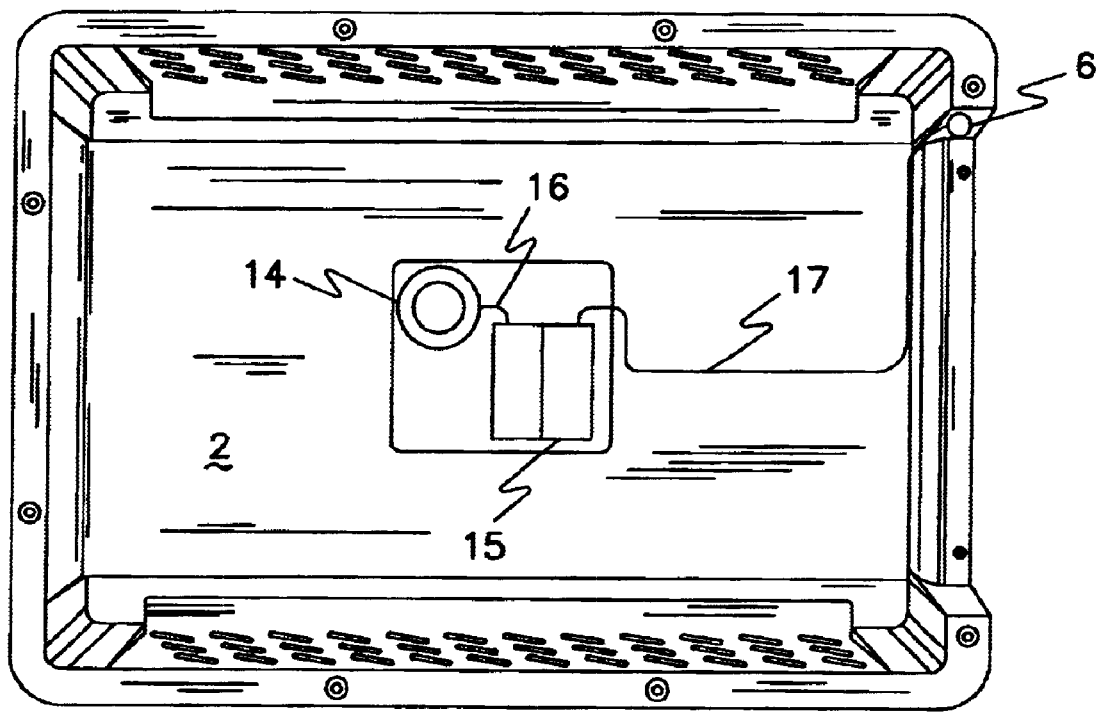
FIG. 5 shows inside the upper portion of the invention.
Figure 6:
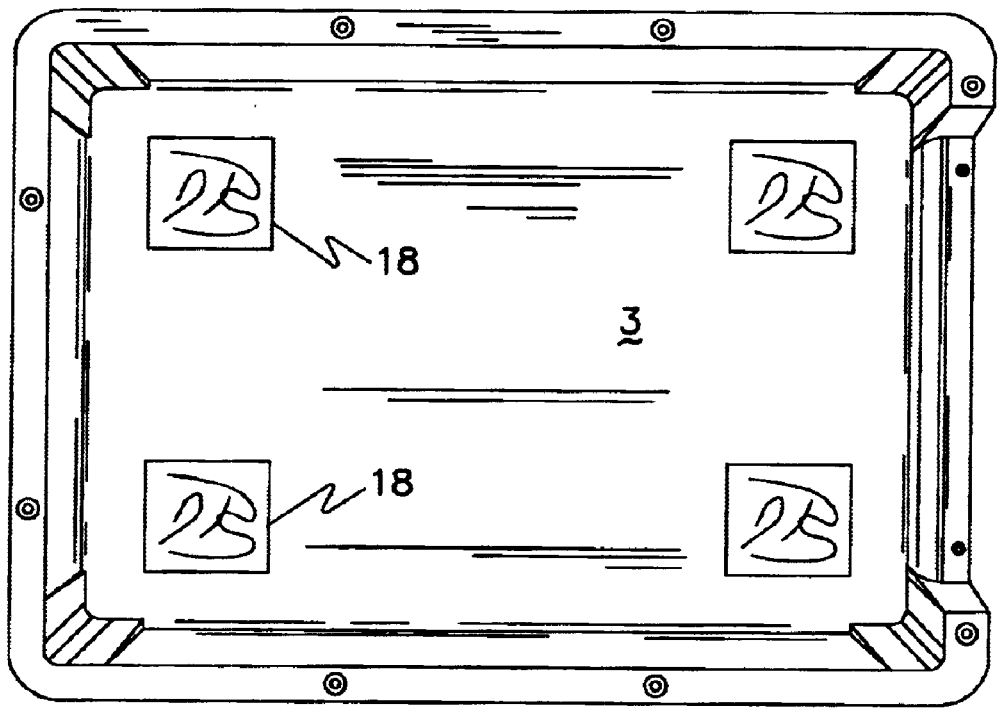
FIG. 6 shows the inside of the lower portion of the invention.

FIG. 5 shows the inside of the upper portion (2), having the light source (14) with wire (16) connected to the battery pack (15). A wire (17) is connected from the battery pack (15) to a contact switch (6). FIG. 6 shows the inside of the lower portion (3). Connecting strips (18) allow for the installation and removal of the pad (13). The strips (18) may be a Velcro type connecting system.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. An animal carrier comprising:

an upper cover having front and back ends connected to a lower base having front and back ends forming a carry area;

a gate attached to said upper cover and said lower base at their respective front ends, whereby said gate opens and closes freely;

a lock mechanism attached to said gate;

a light source located in said carry area; and said upper cover has a recessed area containing an override switch.

2. The animal carrier as recited in claim 1 wherein said light source is battery operated.

3. The animal carrier as recited in claim 2 wherein said lock mechanism contains a contact switch.

4. The animal carrier as recited in claim 3 wherein said lower base has a means for fastening a pad.

* * * * *